May 10, 1955 — I. M. CARPENTER — 2,708,002
AUTOMOBILE LIFTING AND MOVING DEVICE
Filed Jan. 23, 1953 — 2 Sheets-Sheet 1

INVENTOR.
Irvin M. Carpenter,
BY Victor J. Evans & Co.
ATTORNEYS

May 10, 1955     I. M. CARPENTER     2,708,002
AUTOMOBILE LIFTING AND MOVING DEVICE
Filed Jan. 23, 1953     2 Sheets-Sheet 2
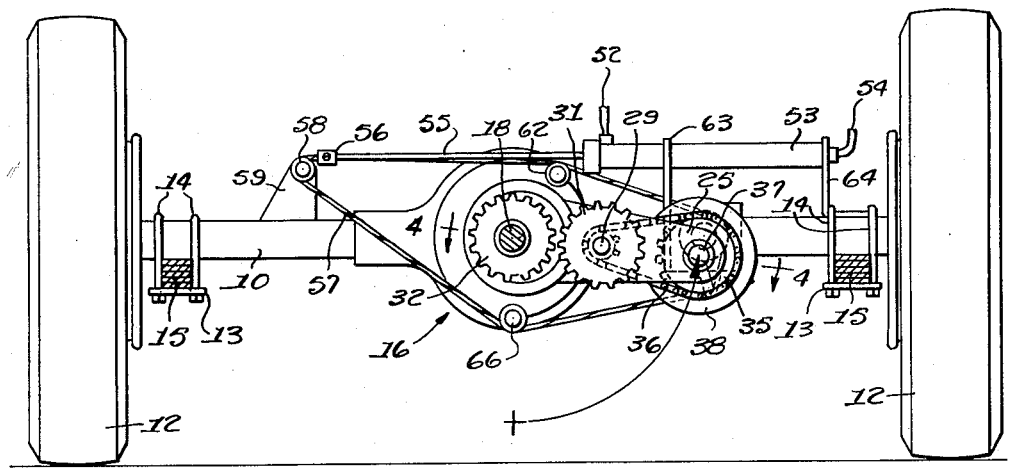
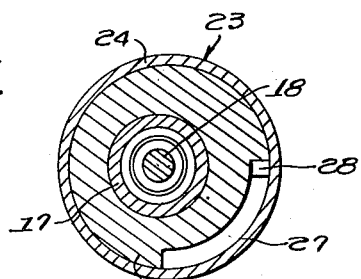
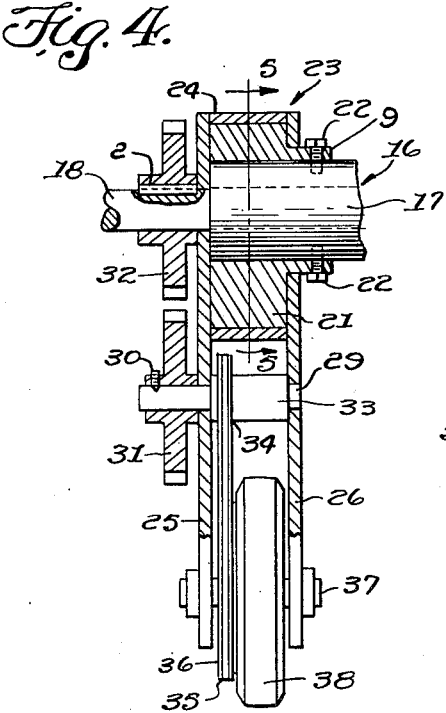
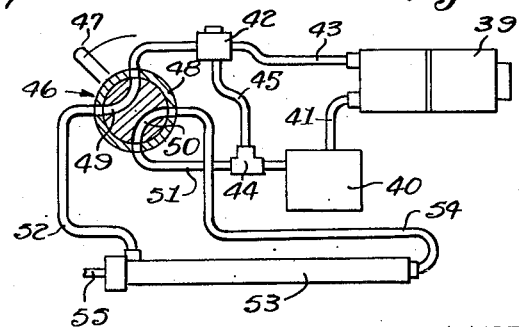
INVENTOR.
Irvin M. Carpenter,
BY Victor J. Evans & Co.
ATTORNEYS

United States Patent Office 2,708,002
Patented May 10, 1955

2,708,002

AUTOMOBILE LIFTING AND MOVING DEVICE

Irvin M. Carpenter, Oklahoma City, Okla.

Application January 23, 1953, Serial No. 332,840

2 Claims. (Cl. 180—1)

This invention relates to a motor vehicle, and more particularly to a mechanism for selectively elevating the vehicle.

The object of the invention is to provide a motor vehicle elevating mechanism which includes a wheel that is mounted for movement into and out of engagement with the ground whereby an end of the vehicle can be raised so as to facilitate the parking of the vehicle in a small space.

Another object of the invention is to provide a motor vehicle power wheel which is constructed so that when the power wheel or traction wheel moves into its operative position in engagement with the ground, there will be automatic intermeshing of gears that enable the traction wheel to be driven from the vehicle engine, and wherein when the traction wheel is moved to its raised position, the gears will be out of meshing engagement so that the traction wheel will not be effected by operation of the vehicle engine.

Another object of the invention is to provide a motor vehicle power wheel which is operatively connected to an end of the vehicle so that the end of the vehicle having the wheel connected thereto can be moved laterally to permit the vehicle to be parked in very small spaces.

Still another object of the invention is to provide an elevating mechanism which can be readily attached to vehicles such as automobiles so that the rear of the vehicle can be elevated whereby the rear end of the vehicle can be readily maneuvered in order to facilitate the parking of the vehicle in small spaces or the changing of tires, the present invention including a fifth wheel which can be driven from the vehicle engine when the fifth wheel is in its lowered position whereby the car can be moved either to the left or right.

A further object of the invention is to provide a motor vehicle power wheel which is extremely simple and inexpensive to manufacture.

Other objects and advantages will be apparent during the course of the following description.

In the accompanying drawings, forming a part of this application, and in which like numerals are used to designate like parts throughout the same:

Figure 3 is a view similar to Figure 1 but showing the traction wheels engaging the ground.

Figure 4 is a sectional view taken on the line 4—4 of Figure 3.

Figure 5 is a sectional view taken on the line 5—5 of Figure 4.

Figure 6 is a schematic view showing the piston operating means for raising and lowering the fifth wheel.

Figure 1:
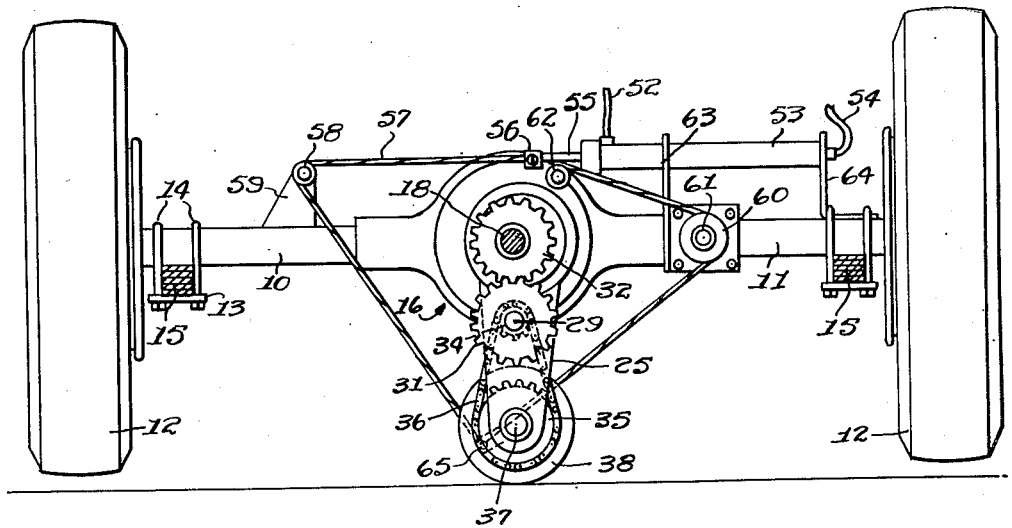
Figure 1 is an elevational view of the rear axle of an automobile showing the lifting device in operative position with the conventional wheels of the vehicle in raised position.
Figure 2:
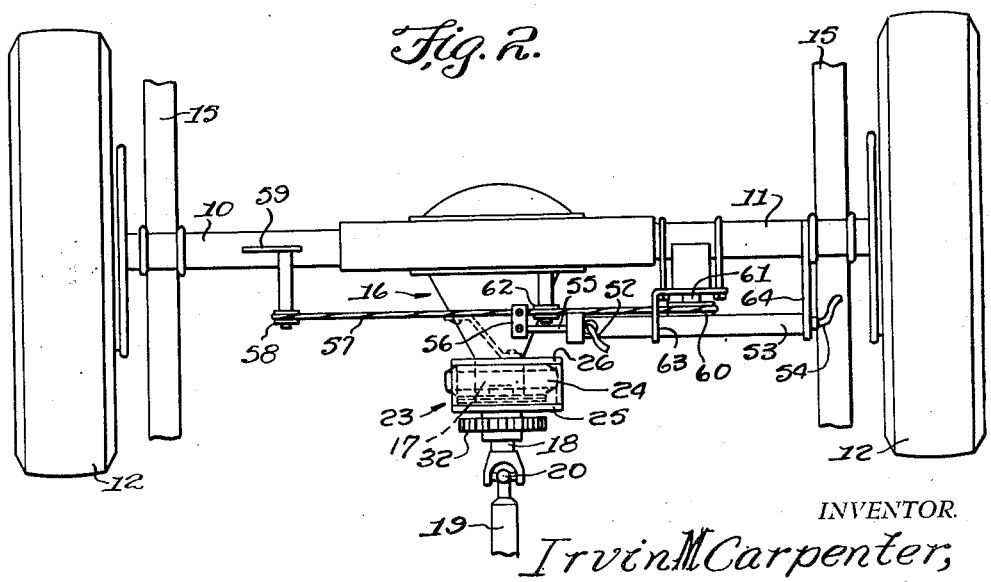
Figure 2 is a top plan view of the assembly shown in Figure 1.

Referring in detail to the drawings, the numerals 10 and 11 designate a pair of axle sections which are arranged in end to end relation with respect to each other, and the sections 10 and 11 may constitute the rear axle of a vehicle such as an automobile. A traction wheel 12 is mounted on the outer ends of each of the axle sections 10 and 11. Springs 15 may be connected to each of the axle sections by bolts 14, and a plate 13 is arranged contiguous to each of the springs 15, Figure 1.

The numeral 16 designates the conventional rear axle housing of the vehicle, and the housing 16 includes a cylindrical neck portion 17, Figure 4. Extending into the housing 16 is a shaft 18, and a universal joint 20 serves to connect the shaft 18 to the conventional drive shaft 19 of the vehicle, and the drive shaft 19 may be operated by the vehicle engine.

Mounted on the neck 17 of the housing 16 is a base 21, and the base 21 has a collar 9 which is adapted to be secured to the housing 16 by suitable securing elements such as screws 22. It will be seen from Figure 5 that the neck 17 of the housing 16 is arranged off center or eccentrically with respect to the center of the base 21.

Rotatably mounted on the base 21 is a casing 23, and the casing 23 includes an annular side wall 24 which rotatably embraces the base 21. Secured to the side wall 24 is a pair of spaced parallel arms 25 and 26 which are mounted for swinging or pivotal movement about a horizontal axis. The base 21 is provided with a cut-out or recess 27, Figure 5, and a lug 28 extends inwardly from the wall 24 of the casing, the lug 28 extending into the recess 27 and serving to limit rotative movement of the casing 23.

Extending between the pair of arms 25 and 26 and supported thereby is a stub shaft 29. A gear 31 is connected to the shaft 29 by means of a set screw 30, and the teeth of the gear 31 are mounted for movement into and out of engagement with the teeth of a second gear 32, the gear 32 being keyed as at 2 or otherwise secured to the shaft 18. Thus, as the shaft 18 rotates, the gear 32 will constantly rotate therewith and only when the arms 25 and 26 are in their lowered position as shown in Figure 5 will the teeth of the gear 31 mesh with the teeth of the gear 32 due to the off center position of the parts as shown in Figure 5.

Secured on the shaft 29 is a sleeve 33, and a sprocket 34 is secured on the sleeve 33. A sprocket 35 is secured on an axle 37 which extends between the arms 25 and 26, and also secured on the axle 37 is a power wheel or fifth wheel 38. An endless chain 36 is trained over the sprockets 34 and 35 so that rotation of the shaft 18 will cause rotation of the fifth wheel 38 when the fifth wheel 38 is in its lowered or ground-engaging position.

A means is provided for raising and lowering the wheel 38, and this means is shown in Figure 6. Thus, there is shown a pump 39 which is connected to a reservoir tank 40 by a conduit 41, and the tank 40 is adapted to hold a suitable fluid medium such as compressed air or hydraulic fluid. There is further provided a relief valve 42 which is connected to the pump 39 by a line 43, and a T 44 is connected to the relief valve 42 by a line 45. A valve 46 includes a rotatable core 48 which is adapted to be rotated by a handle 47, and the rotatable core 48 is provided with a pair of arcuate passageways 49 and 50. A conduit 51 leads from the valve 46 to the T 44, and a conduit 52 leads from the valve 46 to one end of a cylinder 53. A conduit 54 leads from the other end of the cylinder 53 to the valve 46.

The cylinder 53 may have a suitable piston reciprocably or slidably arranged therein, and connected to this piston is a rod 55.

A bushing 56 is mounted on the outer end of the rod 55, and the bushing 56 serves to connect an endless cable 57 to the rod 55. The cable 57 is trained over a pulley 58 which is supported by a bracket 59 that extends upwardly from the axle section 10.

The cable 57 is also trained over a pulley 60 which is mounted on a shaft 61 which can be connected to the axle section 11. And a pulley 62 is also adapted to be engaged by the cable 57. Suitable brackets 63 and 64 may extend from the axle for supporting the cylinder 53, and the cable 57 is connected to the power wheel 38 by a suitable pin 65. There is further provided a guide pulley 66 which is connected to the housing 16, and the guide pulley 66 is adapted to be engaged by the cable 57 when the wheel 38 is in its raised position, Figure 3.

In use, the shaft 19 may be driven by the vehicle engine and this in turn rotates the shaft 18 so that the gear 32 will be rotated while the engine is running. Then, when the wheel 38 is to be used, as for example when the vehicle is to be parked in a very small space, the valve 46 is actuated by means of the handle 47 so that compressed air will be conveyed through the conduit 52 into the cylinder 53. This will cause the rod 55 to be moved into the cylinder 53 whereby the cable 57 will be moved in a clockwise direction, and since the cable 57 is connected to the support for the wheel 38, there will be a clockwise pivotal movement of the wheel 38 from the position shown in Figure 3 to the position shown in Figure 1. Due to the offset arrangement of the parts as shown in Figure 5, the gear 31 will move into meshing engagement with the gear 32 when the wheel 38 is in its lowered position so that the wheel 38 will be rotated to thereby move the vehicle laterally. When the wheel 38 is moved into engagement with the ground, the usual traction wheels 12 will be raised so that they no longer contact the ground. After the vehicle has been parked, or after the tire has been changed, the valve 46 is adjusted so that air passes through the conduit 54 into the other end of the cylinder whereby the rod 55 will be moved out of the cylinder 53 and the cable 57 will be moved in a counterclockwise direction to thereby move the wheel 38 to its raised position. With the wheel 38 is its raised position, the gear 31 will no longer be in meshing engagement with the gear 32 so that the wheel 38 will not be driven.

The valve 46 can be conveniently arranged adjacent the dashboard of the vehicle. The present invention will enable a car to be parked parallel to the curb when there is limited space only available. To park the car, the front wheels of the car are driven in close to the curb until the front bumper of the vehicle is very close to the back bumper of the car parked ahead. Then, the valve 46 is actuated to move the wheel 38 into engagement with the ground and this raises the back end of the car about two inches. Next, the vehicle is put in low gear and the clutch is let out slowly so that the back end of the car will move to the right and after the desired position is reached for parking, the engine is turned off and the brake applied. To remove the car, the vehicle is put in reverse gear so that the back of the car will move to the left and when the back of the car is far enough to the left to clear the car parked in the back, the valve 46 is again adjusted to raise the wheel 38 and permit the traction wheels 12 to engage the ground. Then, the vehicle can be operated in the conventional manner. The gears 31 and 32 are constructed so that they mesh together, and the end of the teeth of these gears are cut at 45 degree angles to insure that the teeth of the gears mesh together.

I claim:

1. In a vehicle, an axle including a pair of sections arranged in end to end relation with respect to each other, a ground-engaging wheel mounted on the outer end of each of said sections, a housing interconnecting the inner ends of said sections together, a drive shaft rotatably supported in said housing and adapted to be connected to a driving source, a base fixed on said housing and said base including an annular collar connected to said housing, a casing rotatably embracing the collar of said base, said casing and base being coaxial, and said base and casing being eccentrically mounted with respect to said drive shaft, a pair of spaced parallel movable arms fixed to and extending from said casing, a stub shaft extending between and rotatably supported in said pair of arms, said drive shaft extending eccentrically through said base and having a first gear secured thereon, a second gear secured on said stub shaft whereby rotation of said casing in one or the other direction will bring said first and second gears into and out of meshing engagement, a stub axle extending between and journaled in said pair of arms, a power wheel mounted on said stub axle, chain and sprocket means connecting said stub axle to said stub shaft, and means secured to said arms and said vehicle for causing swinging movement of said arms.

2. A vehicle comprising an axle embodying a pair of sections, a ground engaging wheel mounted on each of said sections, a housing interconnecting said sections together, a drive shaft rotatably supported in said housing and adapted to be connected to a driving source, a base fixed on said housing and said base including a collar connected to said housing, a casing rotatably embracing the collar of said base, said casing and base being coaxial, and said base and casing being eccentrically mounted with respect to said drive shaft, a pair of movable arms fixed to and extending from said casing, a stub shaft extending between and rotatably supported in said pair of arms, said drive shaft extending eccentrically through said base and having a first gear secured thereon, a second gear secured on said stub shaft whereby rotation of said casing in one or the other direction will bring said first and second gears into and out of meshing engagement, a stub axle extending between and journalled in said pair of arms, a power wheel mounted on said stub axle, chain and sprocket means connecting said stub axle to said stub shaft, and means secured to said arms and said vehicle for causing swinging movement of said arms.

References Cited in the file of this patent
UNITED STATES PATENTS

| | | |
|---|---|---|
| 1,651,727 | Pirquet | Dec. 6, 1927 |
| 1,736,498 | Jensen | Nov. 19, 1929 |
| 1,884,933 | Walker | Oct. 25, 1932 |
| 2,005,173 | Walker | June 18, 1935 |
| 2,136,570 | Walker | Nov. 15, 1938 |
| 2,158,891 | Beacher | May 16, 1939 |